Nov. 10, 1953  J. W. MAGILL  2,658,350
PORTABLE FLOATING TYPE BREAKERWATER UNIT
FOR EFFECTING WAVE ENERGY DISSIPATION
Filed Aug. 31, 1951
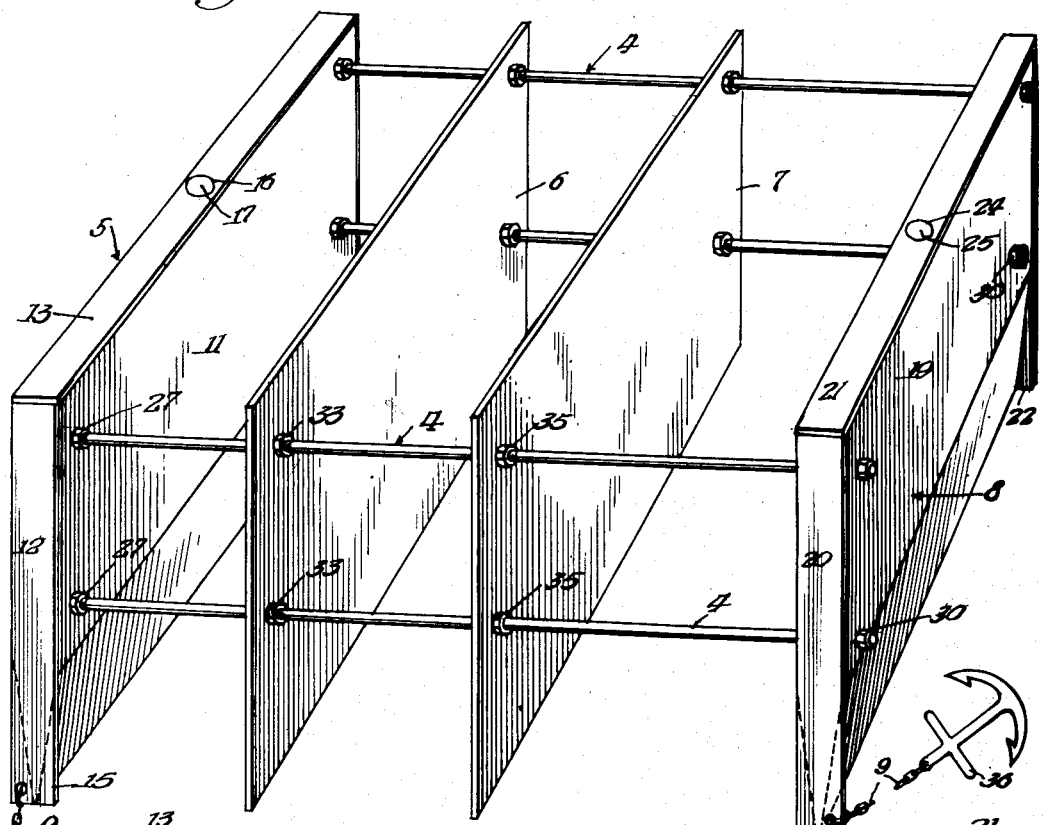
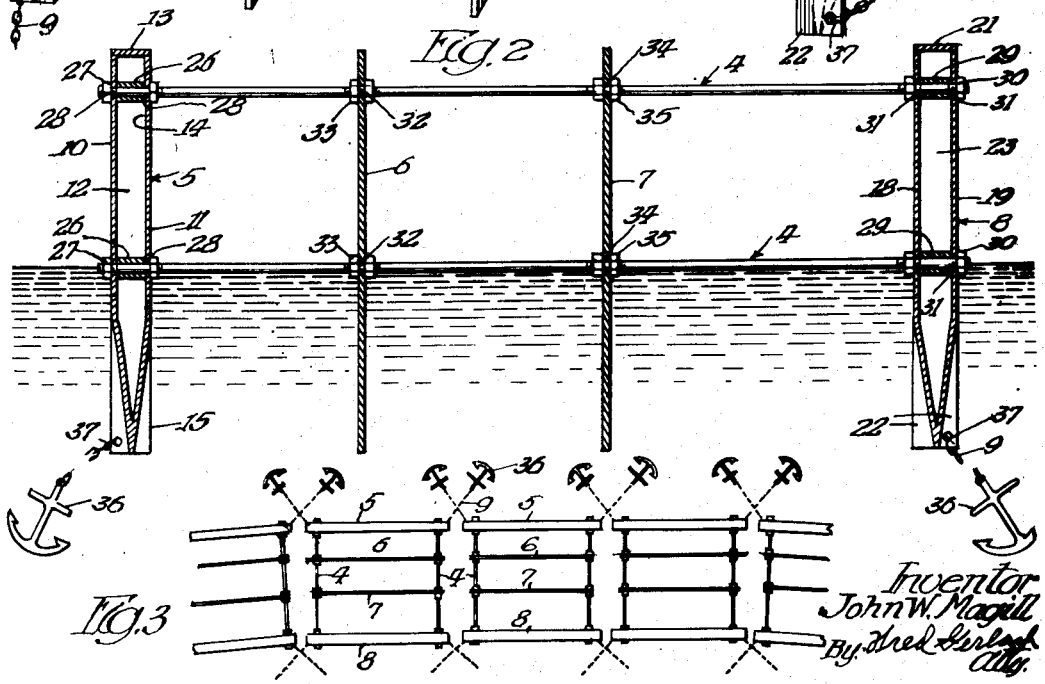
Inventor
John W. Magill Patented Nov. 10, 1953

2,658,350

UNITED STATES PATENT OFFICE 2,658,350

PORTABLE FLOATING TYPE BREAKWATER UNIT FOR EFFECTING WAVE ENERGY DISSIPATION

John W. Magill, Chicago, Ill.

Application August 31, 1951, Serial No. 244,636

6 Claims. (Cl. 61—5)

The present invention relates generally to breakwater units. More particularly the invention relates to that type of breakwater unit which is adapted to be positioned in an open body of water at a location outwards of the adjacent portion of the shore line, is further adapted in connection with adjoining like units to form a breakwater with a protected boat or ship harbor between it and such portion of the shore line, and comprises a mounting structure and a series of upstanding laterally spaced baffle members which are carried by the mounting structure so that they are disposed in substantially parallel relation with said adjacent portion of the shore line, have a height substantially equal to that of the maximum waves that occur outwards of the unit, are positioned on the mounting structure so that the medial portions thereof are disposed at substantially the normal level of the body of water, and are arranged and adapted to effect energy dissipation of the waves that are outwards thereof and impinge thereagainst.

One object of the invention is to provide a breakwater unit of this type which is an improvement upon, and has certain advantages over, previously designed units and is characterized by the fact that it has great capabilities of use in connection with military operations by reason of the fact that it is portable and may be readily towed into position to form with adjoining properly positioned like units a temporary harbor for landing and other craft.

Another object of the invention is to provide a breakwater unit of the type and character under consideration in which certain of the upstanding baffle members are hollow in order to form floats for properly supporting the unit.

Another object of the invention is to provide a breakwater unit of the last mentioned character which includes anchor equipped flexible elements, such, for example, as cables or chains, for mooring or retaining it in its operative position wherein the upstanding baffle members are disposed in substantially parallel relation with the adjacent portion of the shore line.

A further object of the invention is to provide a portable breakwater unit of the type and character under consideration in which the outermost and innermost upstanding baffle members form the floats and have associated with them vertical transversely extending fins which, when the unit is in its operative position, serve, when waves are encountered by the baffle members, to prevent the unit from swinging or moving sidewise.

A still further object of the invention is to provide a portable breakwater unit which is generally of new and improved construction, effectively and efficiently fulfills its intended purpose and is characterized by the fact that it may be produced at a comparatively low cost and also manipulated readily into and out of its operative position.

Other objects of the invention and the various advantages and characteristics of the present breakwater unit will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a portable floating type breakwater unit embodying the invention;

Figure 2 is an enlarged vertical section taken on the line 2—2 of Figure 1 and illustrating in detail the manner in which the nut equipped rods that constitute the mounting structure serve to hold the upstanding baffle members in series form and laterally spaced relation; and Figure 3 is a plan view illustrating the unit with adjoining like units in such operative position as to form a complete breakwater with a boat or ship harbor between it and the adjacent portion of the shore line that borders the body of water in which the units are positioned.

The breakwater unit which is shown in the drawing constitutes the preferred form or embodiment of the invention. It is designed and adapted to be positioned in an open body of water at a location a comparatively small distance outwards of the adjacent shore line and serves together with a group of adjoining like units (see Figure 3) to form a breakwater and a boat or ship harbor between the breakwater and the adjacent shore line. The purpose of the unit is to effect wave energy dissipation to such an extent that the water in the harbor is maintained in a quiescent state regardless of the intensity or magnitude of the waves that are outwards of the breakwater as a whole and impinge or strike thereagainst. As its components or parts the unit comprises a mounting structure in the form of a plurality of laterally spaced normally horizontal rods 4, a series of upstanding laterally spaced baffle members 5, 6, 7 and 8, and a plurality of flexible elements 9 for anchoring the unit in its operative position. The unit is essentially portable and it is contemplated that it will be towed to its place of use.

The rods 4 serve to hold the upstanding baffle members in series form and laterally spaced relation and when the unit is in its operative position extend at substantially right angles to the adjacent shore line in order that the baffle members are positioned substantially in parallel relation with such adjacent portion of the shore line. They are formed of stainless steel, bronze or any other suitable material that is not subject to oxidation or corrosion by sea or fresh water. The thickness and strength of the rods are such that the upstanding baffle members are held in rigid relation.

The upstanding baffle members are arranged so the member 5 is outermost, i. e., farthest from the shore line, the member 8 is innermost, the member 6 is directly behind the outermost member 5 and the member 7 is between members 6 and 8. Whereas but four baffle members are shown in the drawing it is to be understood that the number may be decreased to three or increased to any practical number more than four. In practice it has been found, however, that satisfactory results from the standpoint of wave energy dissipation are obtained when the baffle members are four in number. The outermost and innermost members 5 and 8 are hollow and form floats whereby the unit floats on the body of water in such manner that the lower half portions of the baffle members are immersed in the body of water when the latter is in a quiescent state and the other half portions project above the level of the body of water. The members are preferably, but not necessarily, the same in height and are each no less in height than the maximum waves that are encountered in connection with use of the unit. Generally speaking, the members are rectangular. The outermost baffle member 5 is formed of any suitable non-oxidizing plate metal and consists of an outer side wall 10, an inner side wall 11, a pair of end walls 12 and a top wall 13. The side walls 10 and 11 are coextensive. They are positioned one in front of the other and define with the end walls 12 and the top wall 13 a hollow compartment 14. The lower portions of the two side walls are bent inwards so that they are downwardly convergent and have the bottom margins thereof welded or otherwise fixedly connected together. The end walls 12 of the outermost baffle member 5 are welded or otherwise suitably connected to the end margins of the side walls 10 and 11 and, due to the fact that the lower portions of the side walls converge downwards, have at the lower portions thereof outwardly and inwardly extending fins 15 which extend at right angles to the adjacent portion of the shore line and serve to prevent the unit when in place from swinging or moving sidewise in connection with striking of waves against the upstanding baffle members. The top wall 13 serves as a closure for the upper end of the compartment 14 and has its side margins welded or otherwise fixedly connected to the upper margins of the two side walls and its end margins welded or otherwise fixedly connected to the upper margins of the end walls 12. An opening 16 is formed in the top wall 13 in order to provide access to the compartment 14. This opening is normally closed by way of a cover plate 17 which when removed permits ballast to be inserted into or withdrawn from the compartment 14 via the access opening 16. Due to the fact that the lower portions of the side walls of the outermost baffle member 5 are downwardly convergent the lower portion of the member is permitted to move readily upwards and downwards in the body of water in the event that the unit, in connection with striking of waves against the baffle members, tends to bob up and down to a small extent. The innermost baffle member 8 is the same in size and construction as the outermost baffle member 5. It is spaced an appreciable distance inwards of the member 5 and consists of outer and inner side walls 18 and 19, end walls 20 and a top wall 21. The lower portions of the side walls are bent inwards so that they are downwardly convergent and have the bottom margins thereof welded or otherwise fixedly connected together. The end walls 20 are suitably connected to the end margins of the side walls and have at the lower portions thereof transverse outwardly and inwardly extending fins 22 which function in the same manner as the fins 15 on the end walls 12 of the outermost baffle member 5. The top wall 21 of the baffle member 8 has its margins suitably connected to the upper margins of the side and end walls of the member 8 and defines with the last mentioned walls a closed compartment 23 to which access may be had by way of an opening 24 which is formed in the top wall 21 and is normally closed by a cover plate 25. The upstanding baffle member 6 is formed of any suitable plate metal and is located a predetermined distance inwards of the outermost baffle member 5. It is solid and coacts with the baffle member 5, as hereinafter pointed out, to effect wave energy dissipation. The baffle member 7 is the same in size and form as the baffle member 6 and is spaced inwards of the baffle member 6 the same distance as the baffle member 6 is spaced from the outermost baffle member 5. As best shown in Figure 2, the innermost baffle member 8 is spaced from the baffle member 7 a greater distance than the last mentioned baffle member is spaced from the preceding baffle member 6. In practice it has been found that by so spacing the innermost baffle member 8 most desirable results are obtained. The buoyancy or floating capacity of the baffle members 5 and 8 is such that when the unit is in its operative position the medial portions of the baffle members are at the normal water level of the body of water in which the unit is positioned.

The rods 4 that constitute the mounting structure of the unit extend through and at right angles to the baffle members. The outer ends of the rods 4 extend through sleeves 26 in the outermost baffle member 5 and have spaced apart clamp nuts 27 which are arranged in straddled relation with the ends of the sleeves and serve to hold the outermost baffle member 5 in fixed relation with the outer ends of the rods. The sleeves 26 extend across the compartment 14 and have the ends thereof disposed within, and welded to, aligned holes 28 in the side walls of the outermost baffle member. The inner ends of the rods extend through sleeves 29 in the innermost baffle member 8 and have spaced apart clamp nuts 30 which are arranged in straddled relation with the ends of the sleeves 29. The latter extend transversely across the compartment 23 in the innermost baffle member 8 and have the ends thereof disposed within, and welded to, aligned holes 31 in the side walls of said baffle member 8. The baffle member 6 has holes 32 through which the rods 4 extend. The portions of the rods that extend through the holes 32 are provided with coacting pairs of clamp nuts 33 which are arranged in straddled relation with the baffle member 6 and serve to hold the baffle member against displacement lengthwise of the rods. The baffle member 7 is provided with holes 34 which are aligned with the holes 32 in the baffle member 6 and have the rods 4 extending through them. The portions of the rods that extend through the holes 32 are provided with coacting pairs of clamp nuts 35 which are arranged in straddled relation with the baffle member 7 and serve to hold such baffle member against displacement lengthwise of the rods.

The flexible elements 9 for anchoring the breakwater unit in place are preferably four in number and are arranged so that two are associated with the outermost baffle member 5 and the other two are associated with the innermost baffle member 8. They are preferably in the form of chains or cables and have anchors 36 connected to certain of their ends. The other ends of the elements are provided with clevises 37 which extend through holes in the lower ends of the fins on the float type baffle members 5 and 8. It is contemplated that the two flexible elements that are associated with the outer baffle member 5 will extend outwards away from the shore line and that the other two flexible elements will extend inwards toward the shore line. When the anchors 36 on the flexible elements 9 are in anchored relation with the bottom under the body of water in which the unit is positioned the elements serve to hold the unit in place.

In connection with use the breakwater unit is towed to the desired location. So far as towing is concerned it is contemplated that the unit will be drawn through the water in a direction lengthwise of the baffle members in order that such members will offer minimum resistance. After the unit is properly located the anchors on the flexible elements 9 are dropped onto the bottom under the body of water. It is contemplated that care will be exercised in dropping of the anchors to the end that the flexible elements will hold or retain the unit in proper position with respect to the adjacent portion of the shore line. When waves occur outwards of the unit a wave will strike against and ride upwards on the outer side wall 10 of the outermost baffle member 5. It will then recede after being baffled by the member 5 and thereupon in greatly diminished condition or form pass under the bottom of the member 5 and encounter the baffle member 6. The portion of the remaining wave that flows under the outermost baffle member 5 has a tendency to flow upwards to a limited extent between the members 5 and 6. When such portion recedes in response to the action of the next following wave on the outermost baffle member 5 it passes under the baffle member 6 and encounters the baffle member 7. After encountering the baffle member 7 what is left of the wave flows under the baffle member 7 and encounters the baffle member 8. The latter effects such a baffling action that the body of water that is inwards of the unit is in a substantially quiescent state. The portion of the water that is between the outermost baffle member 5 and the baffle member 6 moves upwards and downwards with a pumping or pulsating action which when the waves are comparatively high is out of phase with the waves striking against the outer side wall 10 of the outermost baffle member 5. This pumping or pulsating action has a marked tendency to produce beneath the baffle members 5 and 6 a barrier zone of water which in connection with the action of the outermost baffle member 5 effectively and efficiently breaks up the wave formation prior to passage of the moving water under the baffle members 7 and 8. As shown in the drawing all four baffle members are arranged so that they extend vertically when the unit is in its normal or operative position. By having the members extending vertically as distinguished from an upwardly inclined angle with respect to the horizontal the waves when striking against the baffle members do not tend to submerge or urge downwards the unit as a whole.

The herein described breakwater unit effectively and efficiently fulfills its intended purpose and due to its particular construction may be produced at a comparatively low cost. It is capable of being towed to its place of use and may be used to good advantage in forming a temporary breakwater in connection with a military operation.

The invention is not to be understood as restricted to the details set forth since these may be modified within the scope of the appended claims without departing from the spirit and scope of the invention.

Having thus described the invention what I claim as new and desire to secure by Letters Patent is:

1. A portable floating type breakwater unit adapted to be positioned in an open body of water at a location outwards of the adjacent portion of the shore line and to form with adjoining like units a complete breakwater with a harbor between it and said adjacent portion of the shore line, and comprising a horizontal series of laterally spaced vertically extending aligned plate-like baffle members having a height substantially equal to that of the maximum waves that occur outwards of the unit when the latter is positioned at said location, and arranged and adapted to effect energy dissipation of the waves that are outwards thereof and strike thereagainst, a mounting structure whereby the baffle members are held in fixed relation, and flexible anchor means connected to the unit and adapted when in place to hold the unit at said location and so that the baffle members are disposed in substantially parallel relation with said adjacent portion of the shore line, certain of the baffle members being hollow and forming floats of such character that the unit, except for said flexible anchor means, is caused to float in the body of water at such an elevation that the medial portions of the baffle members are disposed at substantially the normal level of said body of water.

2. A portable floating type breakwater unit adapted to be positioned in an open body of water at a location outwards of the adjacent portion of the shore line and to form with adjoining like units a complete breakwater with a harbor between it and said adjacent portion of the shore line, and comprising a horizontal series of laterally spaced vertically extending aligned plate-like baffle members having a height substantially equal to that of the maximum waves that occur outwards of the unit when the latter is positioned at said location, and arranged and adapted to effect energy dissipation of the waves that are outwards thereof and strike thereagainst, rods extending between and connected to the baffle members and forming a mounting structure whereby said baffle members are held in fixed relation, and flexible anchor means connected to the unit and adapted when in place to hold the unit at said location and so that the baffle members are disposed in substantially parallel relation with said adjacent portion of the shore line, certain of the baffle members being hollow and forming floats of such character that the unit, except for the flexible anchor means, is caused to float in the body of water at such an elevation that the medial portions of the baffle members are disposed at substantially the normal level of said body of water.

3. A portable floating type breakwater unit adapted to be positioned in an open body of water at a location outwards of the adjacent portion of the shore line and to form with adjoining like units a complete breakwater with a harbor between it and said adjacent portion of the shore line, and comprising a horizontal series of laterally spaced vertically extending aligned plate-like baffle members having a height substantially equal to that of the maximum waves that occur outwards of the unit when the latter is positioned at said location, and arranged and adapted to effect energy dissipation of the waves that are outwards thereof and strike thereagainst, a mounting structure whereby the baffle members are held in fixed relation, flexible anchor means connected to the unit and adapted when in place to hold the unit at said location and so that the baffle members are disposed in substantially parallel relation with said adjacent portion of the shore line, certain of the baffle members being hollow and forming floats of such character that the unit, except for the flexible anchor means, is caused to float in the body of water at such an elevation that the medial portions of the baffle members are disposed at substantially the normal level of said body of water, and vertical fins positioned in fixed relation with certain of the baffle members, extending at right angles to the latter, and adapted to restrain the unit when in place from swinging sidewise.

4. A portable floating type breakwater unit adapted to be positioned in an open body of water at a location outwards of the adjacent portion of the shore line and to form with adjoining like units a complete breakwater with a harbor between it and said adjacent portion of the shore line, and comprising a horizontal series of laterally spaced vertically extending plate-like baffle members arranged and adapted to effect energy dissipation of the waves that are outwards thereof and strike thereagainst, horizontal ribs extending between and connected to the baffle members and forming a mounting structure whereby the baffle members are held in fixed relation, and flexible anchor means connected to the unit and adapted when in place to hold the unit at said location and so that the baffle members are disposed in substantially parallel relation with said adjacent portion of the shore line, the baffle members at the ends of the series being hollow and forming floats of such character that the unit, except for said flexible anchor means, is caused to float in the body of water at such an elevation that the medial portions of the baffle members are disposed at substantially the normal level of said body of water, said baffle members at the ends of the series having fixed vertical fins extending at right angles thereto and adapted to restrain the unit when in place from swinging sidewise.

5. A portable floating type breakwater unit adapted to be positioned in an open body of water at a location outwards of the adjacent portion of the shore line and to form with adjoining like units a complete breakwater with a harbor between it and said adjacent portion of the shore line, and comprising a horizontal series of laterally spaced vertically extending aligned plate-like baffle members having a height substantially equal to that of the maximum waves that occur outwards of the unit when the latter is positioned at said location, and arranged and adapted to effect energy dissipation of the waves that are outwards thereof and strike thereagainst, a mounting structure whereby the baffle members are held in fixed relation, and flexible anchor means connected to the unit and adapted when in place to hold the unit at said location and so that the baffle members are disposed in substantially parallel relation with said adjacent portion of the shore line, certain of the baffle members having downwardly tapered lower portions, being hollow, and forming floats of such character that the unit, except for said flexible anchor means, is caused to float in the body of water at such an elevation that the medial portions of the baffle members are disposed at substantially the normal level of said body of water.

6. A portable floating type breakwater unit adapted to be positioned in an open body of water at a location outwards of the adjacent portion of the shore line and to form with adjoining like units a complete breakwater with a harbor between it and said adjacent portion of the shore line, and comprising a horizontal series of laterally spaced vertically extending aligned baffle members arranged and adapted to effect energy dissipation of the waves that are outwards thereof and strike thereagainst, rods extending between, and connected to, the baffle members and forming a mounting structure whereby said baffle members are held in fixed relation, and flexible anchor means connected to the unit and adapted when in place to hold the unit at said location and so that the baffle members are disposed in substantially parallel relation with said adjacent portion of the shore line, the baffle members at the ends of the series being hollow and forming floats of such character that the unit, except for said flexible anchor means, is caused to float in the body of water at such an elevation that the medial portions of the baffle members are disposed at substantially the normal level of said body of water, said baffle members at the ends of the series having downwardly tapered lower portions and being provided at the ends thereof with vertical fins extending at right angles thereto and adapted to restrain the unit when in place from swinging sidewise.

JOHN W. MAGILL.

References Cited in the file of this patent

UNITED STATES PATENTS

| Number | Name | Date |
|---|---|---|
| 1,801,089 | King | Apr. 14, 1931 |

FOREIGN PATENTS

| Number | Country | Date |
|---|---|---|
| 941 | Great Britain | of 1854 |
| 5,336 | Great Britain | of 1883 |